United States Patent
Schnieder (10) Patent No.: US 11,411,378 B2
(45) Date of Patent: Aug. 9, 2022

(54) CABLE SCREW CONNECTION

(71) Applicant: HARTING ELECTRIC GMBH & CO. KG, Espelkamp (DE)

(72) Inventor: Stefan Schnieder, Bohmte (DE)

(73) Assignee: HARTING ELECTRIC GMBH & CO. KG

(*) Notice: Subject to any disclaimer, the term of this patent is extended or adjusted under 35 U.S.C. 154(b) by 333 days.

(21) Appl. No.: 16/641,143

(22) PCT Filed: Sep. 24, 2018

(86) PCT No.: PCT/DE2018/100807
§ 371 (c)(1),
(2) Date: Feb. 21, 2020

(87) PCT Pub. No.: WO2019/063042
PCT Pub. Date: Apr. 4, 2019

(65) Prior Publication Data
US 2021/0376584 A1   Dec. 2, 2021

(30) Foreign Application Priority Data

Sep. 28, 2017 (DE) ............... 10 2017 122 581.1

(51) Int. Cl.
*H02G 3/08* (2006.01)
*H02G 3/06* (2006.01)

(52) U.S. Cl.
CPC .......... *H02G 3/0675* (2013.01); *H02G 3/088* (2013.01)

(58) Field of Classification Search
CPC ......... H02G 3/08; H02G 3/081; H02G 3/083; H02G 3/22; H02G 3/18; H02G 3/30;
(Continued)

(56) References Cited

U.S. PATENT DOCUMENTS

| 2,479,251 A | 8/1949 | North ............................. 285/6.5 |
| 2,986,409 A * | 5/1961 | Weber ................. H02G 3/0683 174/665 |

(Continued)

FOREIGN PATENT DOCUMENTS

| CN | 1315232 | 5/2007 | |
| CN | 203553456 | 4/2014 | ........... H01R 13/514 |

(Continued)

OTHER PUBLICATIONS

German Search Report (w/machine translation) issued in application No. 10 2017 122 581.1, dated Aug. 23, 2018 (10 pgs).

(Continued)

*Primary Examiner* — Angel R Estrada
(74) *Attorney, Agent, or Firm* — Hayes Soloway P.C.

(57) ABSTRACT

Disclosed is a cable screw connection with a cable screw connection insert for inserting into a housing opening of a housing having at least two housing shells, and for securing the cable screw connection insert to the housing. The cable screw connection insert includes an insert element which is equipped with a thread on the exterior of the housing, wherein a mating nut sits on the thread such that the cable screw connection insert can be fixed to the housing by the screw connection of the mating nut against the outer wall in the surroundings of the housing opening. The flange is equipped with a contour which corresponds to an inner contour of at least one of the housing shells in a formfitting and rotationally fixed manner.

18 Claims, 5 Drawing Sheets

(58) Field of Classification Search
CPC ........ H02G 3/36; H02G 3/0675; H02G 3/088;
H02G 3/06; H05K 5/00; H05K 5/02;
H01R 4/36; H01R 4/64; H01R 13/743;
H01R 13/74; H01R 13/73
USPC ..... 174/650, 666, 668, 72 C, 659, 656, 520,
174/50; 248/68.1, 49, 74.1, 74.2;
285/154.1, 149.1, 154.3, 154.4; 439/552,
439/557, 142, 460, 465, 687, 906
See application file for complete search history.

(56) References Cited

U.S. PATENT DOCUMENTS

| | | | | |
|---|---|---|---|---|
| 3,659,880 | A * | 5/1972 | Goldsobel | F16L 47/04 285/248 |
| 5,132,493 | A * | 7/1992 | Sheehan | H02G 3/06 174/669 |
| 5,679,924 | A | 10/1997 | Young et al. | 174/50 |
| 7,040,916 | B2 | 5/2006 | Schmidt et al. | 439/460 |
| 7,438,327 | B2 * | 10/2008 | Auray | F16L 19/065 285/151.1 |
| 7,635,816 | B1 * | 12/2009 | Shemtov | H02G 3/0666 174/152 G |
| 7,952,034 | B2 * | 5/2011 | Kiely | H02G 15/113 174/665 |
| 7,973,250 | B2 * | 7/2011 | Groeller | H02G 3/22 174/68.3 |
| 8,864,178 | B2 * | 10/2014 | Krug, Jr. | F16L 59/024 285/45 |
| 9,653,839 | B2 | 5/2017 | Andresen et al. | H01R 13/5208 |
| 2004/0177989 | A1 | 9/2004 | Nass et al. | 174/65 SS |
| 2014/0354216 | A1 | 12/2014 | Lin | 320/107 |
| 2016/0006162 | A1 | 1/2016 | Andresen et al. | H01R 13/5208 |

FOREIGN PATENT DOCUMENTS

| | | | |
|---|---|---|---|
| CN | 204290202 | 4/2015 | H02G 3/06 |
| CN | 205231656 | 5/2016 | H02G 3/06 |
| CN | 206498177 | 9/2017 | H02G 15/06 |
| DE | 10311473 | 8/2004 | H01R 13/52 |
| DE | 202005009321 | 8/2005 | F16L 19/06 |
| DE | 102010031345 | 1/2011 | H02G 3/18 |
| EP | 1524731 | 4/2005 | H01R 13/52 |

OTHER PUBLICATIONS

International Search Report (w/translation) and Written Opinion (w/machine translation) issued in application No. PCT/DE2018/100807, dated Dec. 14, 2018 (16 pgs).
Chinese Office Action issued in Chinese Patent Appln. No. 201880062569.7, dated Dec. 18, 2020, 10 pages.
International Preliminary Report on Patentability (w/translation) issued in application No. PCT/DE2018/100807, dated Apr. 9, 2020 (15 pgs).

* cited by examiner

CABLE SCREW CONNECTION

BACKGROUND OF THE INVENTION

The invention relates to a cable screw connection of an electric cable, comprising a cable screw-connection insert for insertion into an opening of a housing and fastening to a housing, and in particular to a non-rotatable cable screw-connection insert and, in particular in this case, also to a related method of cable screw connection. The invention also in this case relates, in particular, to a housing suitable for a non-rotatable cable screw connection and, in particular in this case, to a plug-in connector housing, and to a housing shell suitable for the housing.

Such cable screw connections are required, for example, for housings having electrical and/or electronic components, or for electrical plug-in connection inserts for a wide range of applications, including in power current/heavy duty applications.

PRIOR ART

In many cases, such cable screw connections have an insert element, having an external thread, which is screwed into an opening of a housing that is provided with a corresponding internal thread. However, in the fitting of a preassembled cable, for example, in particular one that is also already equipped with a plug-in connector insert, the cable screw connection, together with the cable, often cannot be screwed easily, or at all, in particular due to lack of space, as the screwing operation causes the cable to rotate within the housing. This is problematic, in particular, in the case of angled plug-in connectors and/or housings, as fitting the cable or a stranded wire, together with a contact, is difficult or impossible, which is especially the case for power current/heavy duty applications. The cables used in these applications, for example in power plants, in the railway and machine sector, etc., may be designed for current intensities of from 100 to 1400 amperes and more, and may have cross-sections of, for example, from 10 mm$^2$ to 300 mm$^2$, such that they are very difficult to bend. This is because the cable and/or the stranded wire are/is inserted into the housing through the cable screw connection or the threaded hole, and then often can no longer be brought into the desired position because of lack of space and/or lack of flexibility of the cable or of the stranded wire.

DE 103 11 473 B3 attempts to counter this problem for other applications by providing a plug-in connector housing composed of two longitudinally divided and connectable half-shells, the parting plane of the half-shells running through a cable gland that has a housing opening, and the cable screw connection having a screw element, likewise consisting of two sub-elements that can be joined together and by means of which, after insertion and fitting of a preassembled cable, the opening of the joined housing is screw-connected to the cable screw connection. However, the formation of a necessary internal thread, corresponding to the screw element, in the opening of the housing half-shells is disadvantageously complex and correspondingly expensive.

The German Patent and Trade Mark Office has searched the following prior art in the priority application relating to the present application: DE 10 2010 031 345 A1, DE 20 2005 009 321 U1, US 2016/0006162 A1, U.S. Pat. No. 5,679,924 A.

OBJECT OF THE INVENTION

The object task of the invention is therefore to provide an inexpensive and reliable cable screw connection that can be used in a simple and flexible manner, in particular also with an associated method for cable screw connection, that are suitable for many applications and cables, in particular also in power current/heavy duty applications. In particular, it is an object in this case to provide a cable screw-connection insert suitable for the cable screw connection, and a suitable housing, and in particular a plug-in connector housing, which may be composed of housing shells that can be joined together. In this regard, it is also an object to provide a suitable housing shell for a suitable housing.

SUMMARY OF THE INVENTION

The invention in this case relates, in particular, to a cable screw connection having a cable screw-connection insert for insertion into a housing opening of a housing comprising at least two housing shells, the parting plane of which runs through the housing opening, for the purpose of fastening the cable screw-connection insert to the housing. The cable screw-connection insert in this case comprises an insert element, on which a flange is realized in such a manner that, when inserted into at least one of the housing shells, the cable screw-connection insert is arranged non-rotatably in the housing shell. By means of the above advantageously non-rotatable arrangement of the cable screw-connection insert, as a result solely of insertion of its insert element into a housing shell, it becomes possible to screw against an outer wall, in the vicinity of the housing opening of the housing, by means of a locknut arranged, outside the housing, on a thread of the insert element, and thereby to fix the cable screw-connection insert to the housing, without a cable, arranged in the cable screw-connection insert, rotating concomitantly within the housing as the locknut is being screw-fastened.

This is particularly advantageous for the use of a preassembled cable, which may already be equipped with other elements such as, for instance, a plug-in connector insert, and/or for a housing having a geometry that only allows limited, predetermined positions of the cable, such as, for example, an angled housing. In addition, this eliminates the need for the disadvantageously costly production of an internal thread in the housing openings of separate housing shells.

In this case, particularly advantageously, realized on the flange is a contour, which corresponds in a form-fitting and non-rotatable manner to an inner contour, or contour, of at least one of the housing shells, such that it is ensured that the non-rotatable arrangement of the flange in the housing shell does not allow any play. Advantageously in this case, a contour of the flange that is suitable for this purpose is realized, in particular, on a circumferential edge of the flange.

Moreover, the contour of the flange may be realized in many different ways. For example, the contour may be square, oval or a circle provided with a gap, etc.

Advantageously, the contour of the flange may be circular with at least one flattened portion, which opens up the possibility of a runner-type insertion of the flange into a corresponding inner contour of a housing shell that has a corresponding arrangement of the flattened portion. The handling and assembly, and in particular the automated assembly, of a cable screw-connection insert and housing thus becomes particularly simple and easy.

Particularly advantageously, for this purpose the flange may be realized in a circular shape, having two mutually opposite symmetrical flattened portions, both of which both provide the above advantages. Moreover, due to the symmetry of the flange, a desirable flexibility is advantageously provided in respect of insertion of the flange into the housing shell, as there is more than one possibility for its insertion.

In addition, the insert element of the screw-connection insert may expediently be provided with a gradation, on the outside of the housing, which projects over the edge of the housing opening. The gradation in this case corresponds to the flange projecting on the inside beyond the edge of the housing opening, in such a manner that an advantageously compact and stable nesting of the insert element and housing is provided in the region of the housing opening by means of the insert element inserted into the housing.

A cable screw-connection insert according to the invention may be made, for example, of plastic or metal. A gland, which extends into the interior of the housing, may expediently be provided on the flange of the insert element of the cable screw-connection insert. This is particularly advantageous for a metal cable screw-connection insert and a metal housing, as an electrically conductive shield of a cable arranged in the cable screw-connection insert and extending into the housing can be easily and effectively fastened to the gland. This allows effective shielding of the cable screw-connection insert and of the housing.

For particularly simple and yet effective sealing of the housing, an annular sealing element is advantageously arranged on the insert element, in proximity to the flange, for the purpose of sealing the housing opening on the inside. This arrangement and design of the sealing element is particularly advantageous, since a sealing element alternatively arranged on the outside and acting in combination with the locknut would have to be comparatively larger. A particularly compact and also particularly easy to handle cable screw-connection insert, provided with the sealing element, is thus made possible. The sealing element in this case may also expediently be arranged in a groove of the insert element, such that it is advantageously fixed in its intended position.

For a particularly effective seal, in this case a bevel may also be provided on an inner edge of the housing opening, for the purpose of partially accommodating the sealing element. The bevel in this case advantageously protects the sealing element from possible damage during the assembling of the cable screw-connection insert, and in particular during the screw-fastening of the lockout, when the flange is pulled against the inner wall in the vicinity of the housing opening, and thereby presses the sealing element against this wall and also against the edge of the housing opening. Accordingly, the present invention also relates in particular to a housing suitable for and acting in combination with a cable screw connection according to the invention, which is described in greater detail below.

Furthermore, a sleeve nut, which accommodates a further sealing element and acts in combination with it to seal the region of the cable screw-connection insert located on the outside of the housing, may also expediently be provided on the thread of the insert element. The thread in this case may advantageously comprise a first threaded region, which acts in combination with the locknut, and a second threaded region, which acts in combination with the sleeve nut, wherein the first and the second threaded region may advantageously be spaced apart from each another, and/or may be provided from different threads, thereby preventing a collision of the locknut and sleeve nut during assembly.

A housing suitable for a cable screw connection according to the invention, and in particular a cable screw-connection insert according to the invention, in this case expediently comprises, in particular, a housing opening, and at least two housing shells, the parting plane of which runs through the housing opening. Expediently, the previously described inner contour of at least one housing shell, which corresponds to the contour of the flange of the insert element of the cable screw-connection insert, is provided next to the housing opening. The inner contour in this case may advantageously be realized on a gradation of the edge of the housing opening of at least one of the housing shells.

In particular, suitable in this case for a housing according to the invention, as above, is a plug-in connector housing for the insertion of an electric cable which, as described above, may in particular be already preassembled with a plug-in connector insert.

The present invention furthermore relates to a housing shell suitable for a housing, as above, in which, provided next to the gradation and the flange of the insert element of the cable screw-connection insert, there is at least one projection that, by acting in combination with the inside wall of the housing in the vicinity of the housing opening, provides a runner-type and advantageously non-tilting guidance of the flange. The projection in this case may also expediently comprise a hole for the purpose of screw-fastening two housing shells. A housing shell realized in such a manner is advantageously suitable, in particular, for the particularly suitable circular flange described above, having two opposite flattened portions, and the inner contour corresponding to the flange, which is also described above and is expediently realized on the gradation.

For particularly simple and flexible handling and assembly, the housing shell is realized as a first half-shell of the housing, the parting plane of which advantageously runs centrally through the housing opening, and which corresponds to a second housing shell of the housing that is of substantially identical design, wherein the complete housing is provided by joining the first and the second housing shell, at least in the vicinity of the insert element of the cable screw-connection insert. A housing formed from two identical housing half-shells is particularly simple and inexpensive to produce and assemble, and flexible in respect of assembling the cable screw-connection insert with the housing. Moreover, the realization of the projecting inner contour in both housing shells enables the flange, and thus the cable screw-connection insert, to fit in a particularly non-rotatable manner in the housing.

As stated above, the advantageously non-rotatable arrangement of the cable screw-connection insert makes it possible, advantageously, to fix the cable screw-connection insert to the housing merely by inserting its insert element into a housing shell, in a first step, and by screw-fastening a locknut, arranged on a thread of the insert element, against an outer wall in the vicinity of the housing opening, in a further step, without a cable arranged in the cable screw-connection insert rotating concomitantly within the housing as the locknut is being screw-fastened.

In particular, even before the insert element is inserted into the housing shell and/or subsequently, the cable and/or a stranded wire and/or a plug-in connector insert on the cable can in this case be brought into a predetermined position and fitted in an advantageously flexible manner.

The invention furthermore relates to a method for cable screw connection of a cable screw-connection insert, into which a cable is already inserted, for insertion into a housing opening of a housing comprising at least two housing shells, the parting plane of which runs through the housing opening, for the purpose of fastening the cable screw-connection insert to the housing, comprising the steps:

fitting the cable and/or a stranded wire and/or a contact and/or a plug-in connector insert already preassembled on the cable, according to its intended use, in a first step;

placing the cable in a predetermined position, in a second step;

inserting the cable screw-connection insert into the housing opening of a housing shell of the housing, in a third step;

arranging a flange of the cable screw-connection insert in a non-rotatable manner with a contour in contact with an inner contour of the housing shell, in a fourth step;

joining the housing shell to at least one further housing shell, in a fifth step;

screw-fastening a lockout arranged on the cable screw-connection insert, such that the cable screw-connection insert is fixed to the housing, in a sixth step.

The use of a cable screw-connection insert described above, and/or of a housing described above, and/or a housing shell described above is particularly suitable in this case. The method according to the invention thus also includes the features described above, and makes use of their advantages.

The above method, the above cable screw-connection insert, the above housing and the above housing shell are particularly suitable in this case for power current/heavy duty applications, and their cables. As mentioned at the beginning, the cables used in these applications, e.g. in power plants, in the railway and machine sector, etc., may be designed for current intensities of from 100 to 1400 amperes and more, and may have cross-sections of, for example, from 10 mm² to 300 mm², which makes them very difficult to bend. By means of a non-rotatable cable screw connection of an above embodiment of the invention, this can advantageously be effected outside of the housing, before insertion of a cable screw-connection insert having an inserted cable, and therefore it is not necessary for this to be effected inside the housing, for which reason the cable screw connection according to the invention is particularly suitable for angled housings.

To persons skilled in the art, it is obvious, in particular in the case of cables of comparatively smaller dimensions, having a cable screw-connection insert of comparatively smaller dimensions, that the method steps may also be usefully executed in a different sequence.

For example, the above third and fourth steps of the method may be executed in a single step, in particular in the case of use of the above cable screw-connection insert according to the invention, which makes assembly particularly easy. Furthermore, the above third and fourth steps may expediently be executed before the above first step, which provides flexibility for the use of the cable screw-connection insert for a multiplicity of differently designed housings and applications.

BRIEF DESCRIPTION OF THE DRAWINGS

Exemplary embodiments of the invention are represented in the drawings, and explained in greater detail in the following. There are shown:

FIG. 2b a section through the housing shell from FIG. 2a, along the line R-R from FIG. 2a;

FIG. 3b an assembled housing according to an embodiment of the invention, with the cable screw-connection insert and the housing shell from FIG. 3a;

FIG. 4c an enlarged representation of the detail A1 from FIG. 4a; and

The figures show partly simplified, schematic representations. In some cases, elements that are alike, but not identical, are denoted by identical reference numbers. Differing views of identical elements could be scaled differently.

DETAILED DESCRIPTION OF THE INVENTION

Figure 1A:
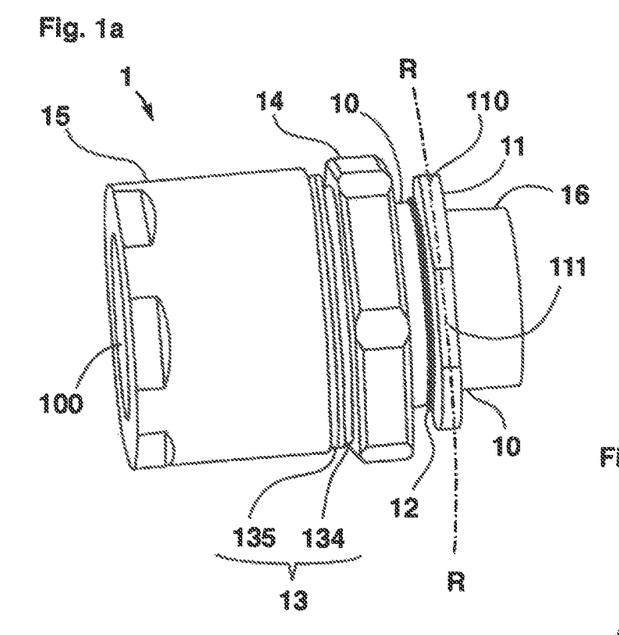
FIGS. 1a and 1b a perspective representation of, respectively, a complete and an incomplete cable screw-connection insert according to an embodiment of the invention.

FIG. 1a shows a perspective representation of a cable screw-connection insert 1 according to an embodiment of the invention, comprising an insert element 10, a flange 11 being realized on the region thereof that is designed to be arranged within a housing shell 20 of a housing 2. A housing 2, as above, suitable for the cable screw-connection insert 1 and comprising a housing shell 20, is described below with reference to FIGS. 2a and 2b.

In the vicinity of the flange 11, the insert element 10 carries an annular sealing element 12 for sealing a housing opening 200 of the housing 2 into which the cable screw-connection insert 1 is inserted, which is described below with reference to FIGS. 3a and 4a. A thread 13, which acts in combination with a locknut 14, is realized on the region of the insert element 10 of the cable screw-connection insert 1 that is designed to be arranged outside the housing 2.

In addition, arranged on the thread 13 of the insert element 10 is a sleeve nut 15, which likewise acts in combination with the thread 13, and the function of which is described below with reference to FIG. 4a. The through-going opening 100 provided in the longitudinal direction of the cable screw-connection insert 1 is designed to accommodate a cable 3, which is described in greater detail below with reference to FIGS. 3b and 4a.

In addition, a gland 16, which extends from the flange 11 into the interior of the housing 2, is realized on the region of the insert element 10 of the cable screw-connection insert 1 that is designed to be arranged within the housing 2. Moreover, in particular, the insert element 10, the flange 11, the gland 16 and the locknut 14 of the cable screw-connection insert 1 of this embodiment of the invention are advantageously, by way of example, made from an electrically conductive material, which is explained below with reference to FIG. 4a.

Figure 1B:
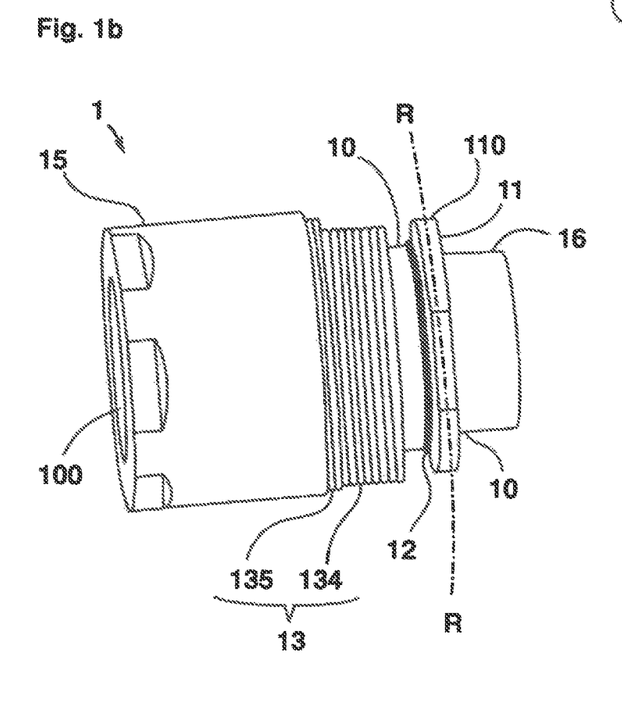

FIG. 1b shows the cable screw-connection insert 1 from FIG. 1a without the locknut 14, in order to illustrate more clearly the subdivision of the thread 13 into a first threaded region 134, which acts in combination with the locknut 14, and into a second threaded region 135, which acts in combination with the sleeve nut 15. The first and the second threaded region 134 and 135 are also slightly spaced apart from each other on the insert element 10, thereby preventing a collision of the locknut 14 and the sleeve nut 15.

Figure 1C:
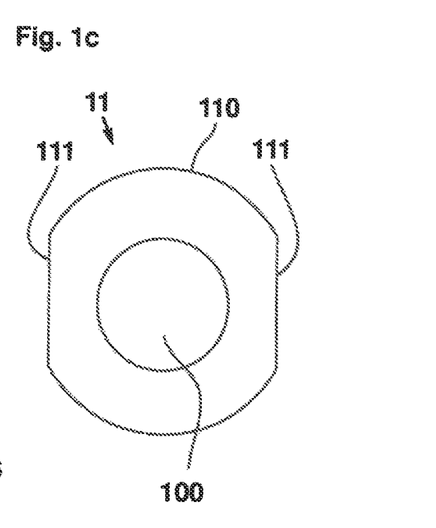
FIG. 1c a section through the embodiment of FIGS. 1a and 1b, in each case along the line R-R from FIG. 1a and 1b.

FIG. 1c shows a section through the embodiment of FIGS. 1a and 1b, in each case along the line R-R of FIGS. 1a and 1b, which extends along the circumferential edge R of the flange 11. In the case of this embodiment, the contour 110 of the flange 11 is advantageously realized, by way of example, as a circle provided with two opposite flattened portions 111. The functioning of this embodiment is described below with reference to FIG. 2a, b and FIG. 3a.

Figure 2A:
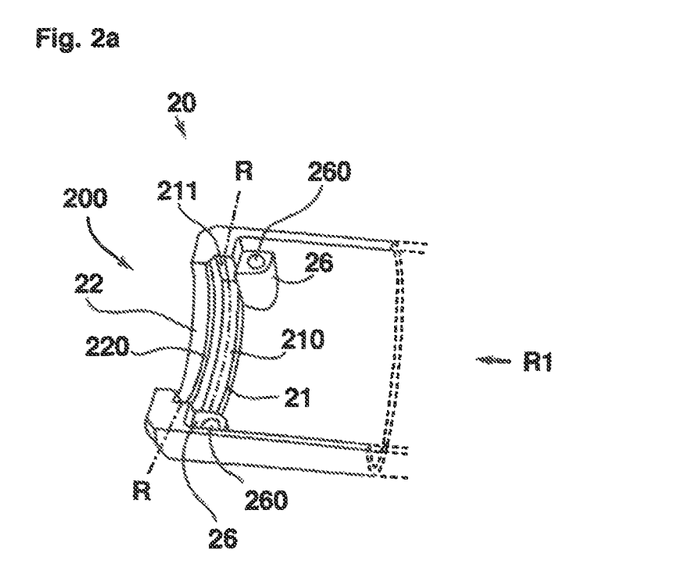
FIG. 2a a perspective representation of a detail of the housing shell according to an embodiment of the invention.

FIG. 2a shows a perspective representation of a detail of a housing shell 20 according to an embodiment of the invention that, expediently, is realized as a housing half-shell, and that is suitable for a housing 2 according to an embodiment of the invention. The housing shell 20 comprises a part of a centrally divided circular housing opening 200 of the housing 2, the edge 22 of which extends into the interior of the housing 2. Realized in the interior of the housing 2, adjoining the edge 22, is a gradation 21, the contour of which is the inner contour 210 of the housing shell 20, and which is realized so as to correspond to the contour 110 of the flange 11, described above on the basis of FIG. 1c, in such a manner that the flange 11 of the cable screw-connection insert 1, when inserted into the housing shell 20, is arranged in a form-fitting and non-rotatable manner in the housing shell 20.

Provided next to the gradation 21 are two expediently mutually opposite projections 26, having holes 260, for the purpose of providing a permanent screw connection of two similar housing shells 20 realized as half-shells. The arrangement of the projections 26 at the gradation 21, in combination with the inside wall in the vicinity of the housing opening 200, provides a runner-type structure, and enables the insert element 10 to be inserted into the housing shell 20 particularly easily, without tilting. This is because, when an insert element 10 has been inserted, the projections 26 are arranged on the inside adjacent to its flange 11, thus providing an advantageous nesting of the projection 26, the flange 11 and the edge 22 on the inside of the housing. Reference is also made here to the illustration in FIG. 3a.

Figure 2B:
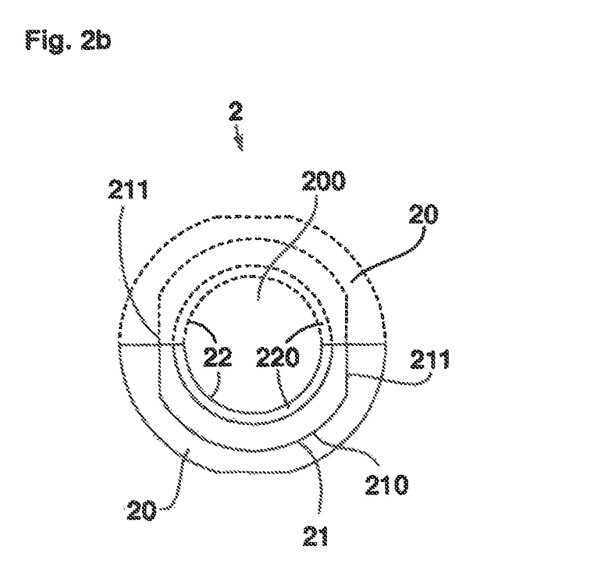

The inner contour 210 of the gradation 21 adjacent to the edge 22 of the housing shell 20 is represented in FIG. 2b, which shows a section through the housing shell 20, along the line R-R from FIG. 2a, from the direction of view of the arrow R1 from FIG. 2a. Together with the housing shell 20 from FIG. 2a, advantageously realized as a housing half-shell, also represented in FIG. 2b in this case, by means of the broken line, is a substantially symmetrical, second housing half-shell of a correspondingly assembled housing 2. The inner contour 210 of the gradation 21 of the housing 2 in this case is expediently realized as a circle advantageously corresponding to the above contour 110 of the flange 11 and having correspondingly mutually opposite flattened portions 211. In this case, when the insert element 10 has been inserted into the assembled housing 2, the complete contour 110, with the mutually opposite flattened portions 111 of the contour 110 of the flange 11, is inserted in a form-fitting and non-rotatable manner into the inner contour 210 of the gradation 21, which is also explained below with reference to FIGS. 3a and 4b.

Figure 3A:
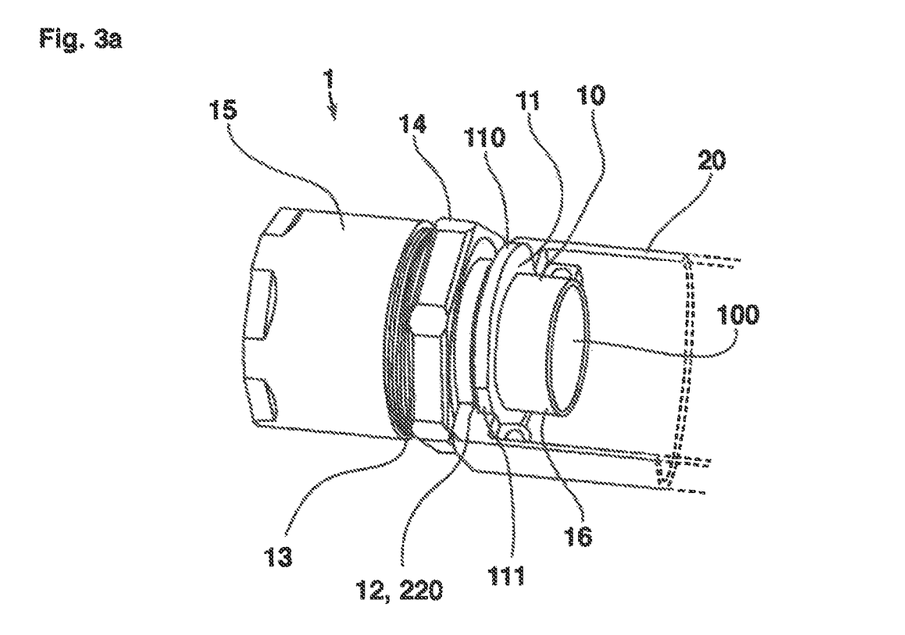
FIG. 3a the cable screw-connection insert from FIGS. 1a and 1b, inserted in the housing shell from FIG. 2b.

Shown in FIG. 3a, inserted into the housing shell 20 from FIG. 2b, is the cable screw-connection insert 1 from FIGS. 1a and 1b, with the insert element 10, comprising the gland 16 extending inwardly into the housing shell 20, and with the sealing element 12, which is arranged in the vicinity of the flange 11 and adjacent to a bevel 220 of the edge 22 of the housing opening 200. By screw-fastening of the locknut 14, the flange 11, which projects completely over the edge 22 of the housing opening 200, with the sealing element 12, can thus be pulled against the inside wall of the housing shell 20 in the vicinity of the edge 22, enabling the cable screw-connection insert 1 to be fixed to the housing 2. The housing 2 is thereby also sealed-off by means of the sealing element 12.

Figure 3B:
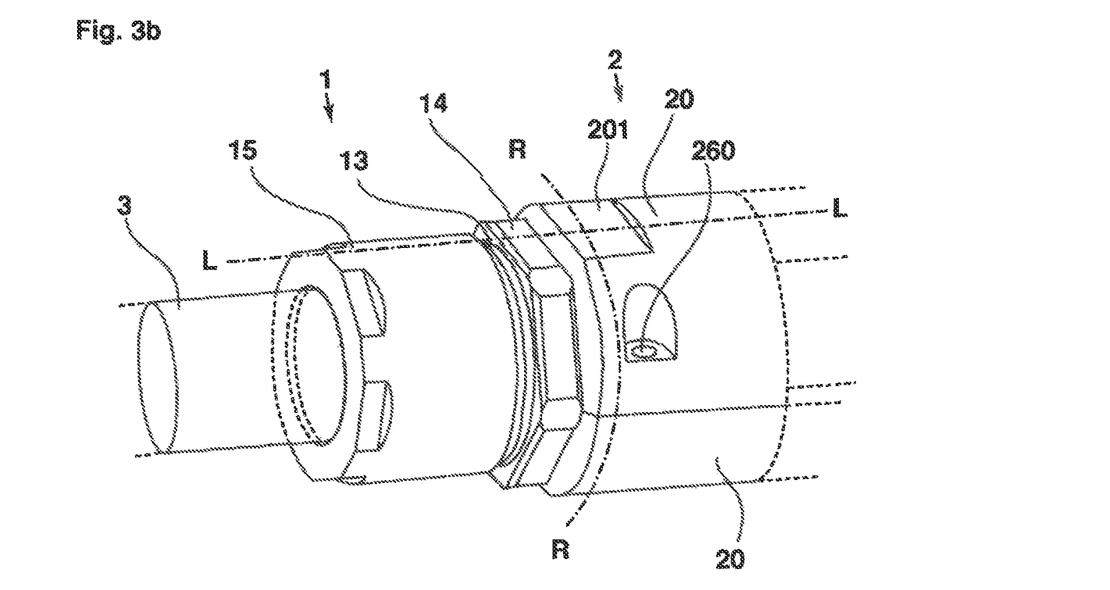

FIG. 3b shows the fully assembled cable screw-connection insert 1 from FIG. 3a, comprising the housing shells 20 formed by two substantially identical half-shells, and also comprising a cable 3. The locknut 14 in this case has been screwed against the housing 2, which is described below with reference to FIG. 4a, which shows a longitudinal section through the cable screw-connection insert 1 and the housing 2, along the line L-L. Realized on the outer edge of the housing 2, to facilitate manipulation in the assembling operation, and in particular in the screw-fastening of the lockout 14, are suitable flattened portions 201 of the substantially cylindrical housing 2, which enable the housing 2 to be fixed in a simple and stable manner.

It should be mentioned at this point that, in the figures of the housing 2 and the housing shell 20, only their details in the vicinity of the housing opening 200 are shown, although a complete housing 2 may be realized in many different ways. For example, a complete housing 2 may be cylindrical, or the detail of the housing 2 shown in the figures may be a housing gland, which further along is adjoined by an angled and/or Widened portion of the housing, etc.

Figure 4A:
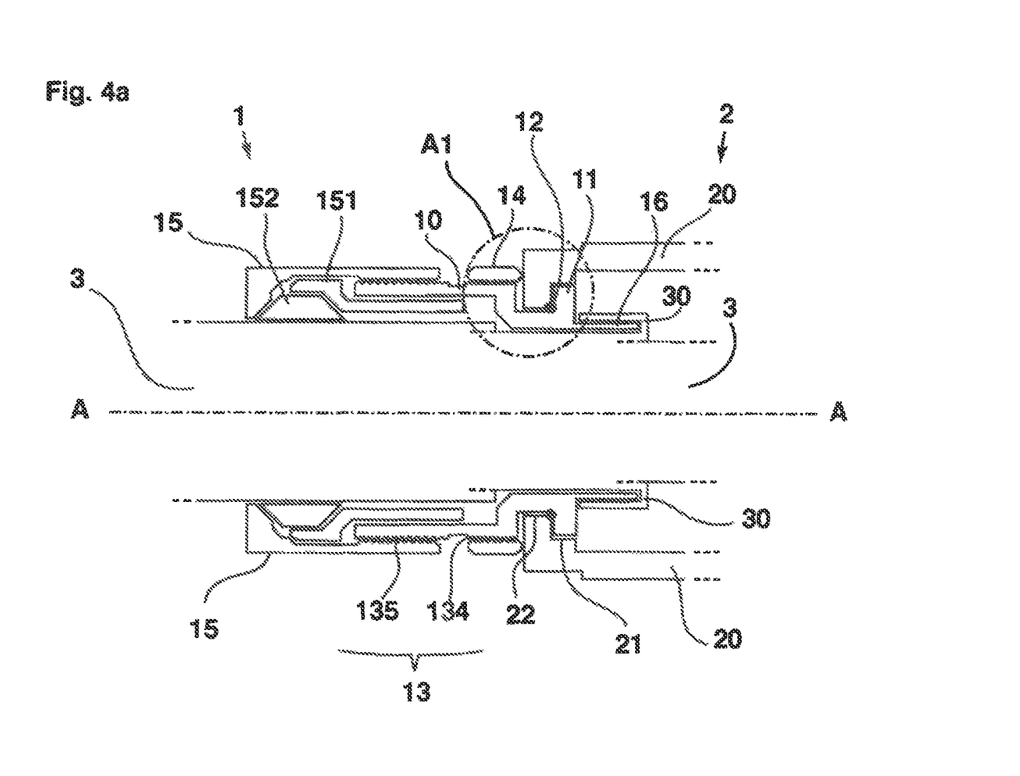
FIG. 4a a longitudinal section through the embodiment from FIG. 3b, along the line L-L from FIG. 3b.

FIG. 4a shows a longitudinal section through the cable screw-connection insert 1 and the housing 2 from FIG. 3b, along the line L-L from FIG. 3b. The cable screw-connection insert 1, with the cable 3, is fully assembled and fixed with the insert element 10 inserted into the housing 2. An electrical shield 30 of the cable 3, arranged inside the housing 2 and bared at one end, is expediently brought into contact with the gland 16. In this case, advantageously, the insert element 10, with the flange 11 and the housing 2, may be made of an electrically conductive material, such that the housing 2 is electrically shielded via their contact.

The flange 11 is arranged in form-fitting and non-rotatable contact with the gradation 21 and is pulled against the inside wall, in the vicinity of the housing opening 200 of the housing 2, by means of the locknut 14 screwed against the outside wall in the vicinity of the housing opening 200, after which the cable screw-connection insert 1 is fixed to the housing 2. The flange 11, which projects radially fully beyond the edge 22 of the housing opening 200, thereby seats off the housing 2 outwardly, by means of the sealing element 12, in the region of the bevel 220 of the edge 22.

The locknut 14 and sleeve nut 15 are each respectively seated in regions 134 and 135 of a thread 13, realized on the insert element 10, that are expediently spaced apart from each other. The sleeve nut 15, which is also screw-fastened, accommodates an expediently elastically realized basket-like plastic insert 151, which also extends partially into the insert element 10, and also a sealing element 152 that acts in combination with the plastic insert 151 and the sleeve nut 15, which outwardly seal the cable 3 and the insert element 10.

Figure 4B:
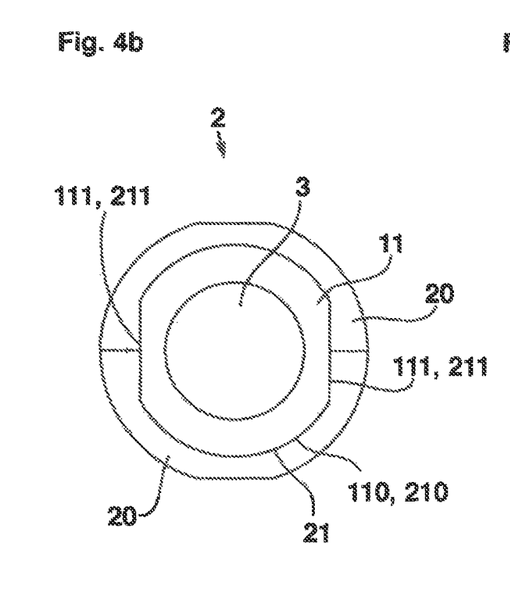
FIG. 4b a cross-section through the embodiment from FIG. 3b, along the line R-R from FIG. 3b.

In relation to this, FIG. 4b shows a cross-section through the cable screw-connection insert 1 and the housing 2 from FIG. 3b, along the line R-R from FIG. 3b, the housing shells 20, in the case of this embodiment, being expediently symmetrical in the region of the gradation 21. The contour 110 of the flange 11 in this case is fully in form-fitting contact with is the inner contour 210 of the gradation 21, such that, by means of the flange 11 and the gradation 21, the cable screw-connection insert 1 is arranged in a non-rotatable manner. FIG. 4b in this case shows a composite view of FIGS. 1c and 2b, for which reason reference is also made here to the relevant description.

Figure 4C:
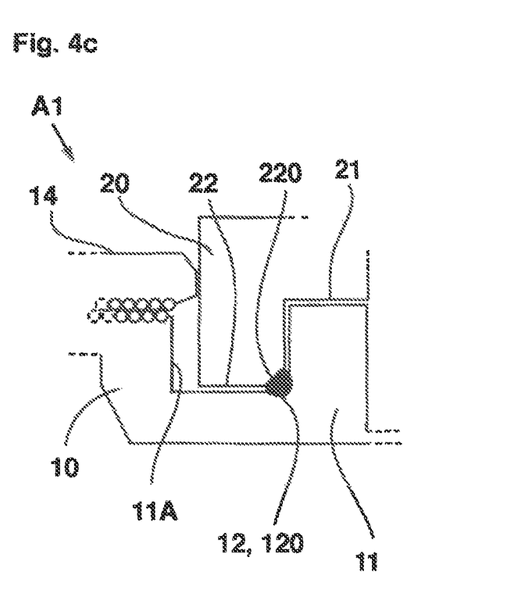

FIG. 4c shows an enlarged representation of the detail A1 from FIG. 4a, with a stepping 11A being realized, on the region of the insert element 10 arranged on the outside and adjacent to the housing opening 200, with the thread 13, 134 for the locknut 14. Like the flange 11 on the inside, in this case the stepping 11A on the outside projects fully beyond the edge 22 of the housing opening 200, such that, by means of the stepping 11A, the edge 22 and the flange 11, an advantageous nesting of the housing 2 and the insert element 10 is provided in the region of the housing opening 200. Corresponding to the bevel 220 of the edge 22 of the housing 2, which partially accommodates the sealing element 12, also expediently realized in the insert element 10 is a groove 120, which is adjacent to the flange 11 and which additionally partially accommodates the sealing element.

Figure 5A:
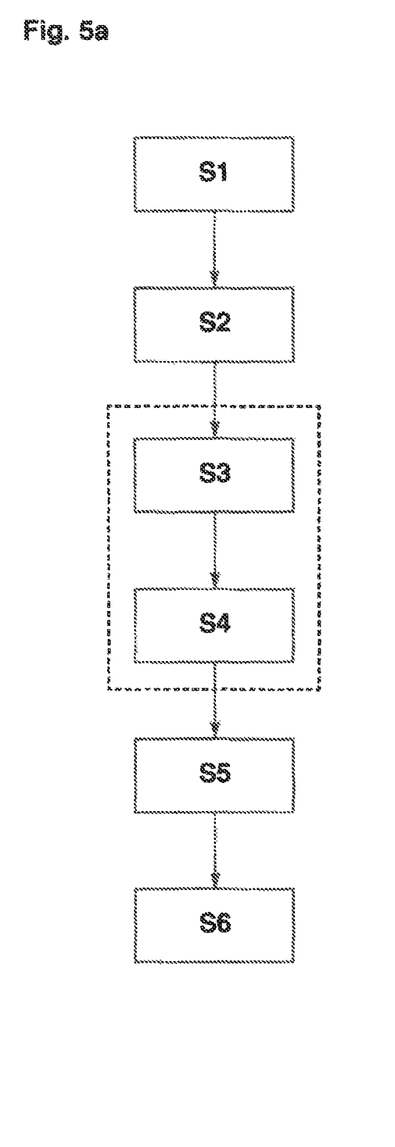
FIGS. 5a and 5b in each case a schematic diagram of the steps in the execution of a method according to the invention.

FIG. 5a shows a flow diagram of the essential steps of a method for cable screw connection according to an embodiment of the invention by use of a cable screw-connection insert 1 according to the embodiment of FIGS. 1 to 4, and of a housing shell 20 according to the embodiment of FIGS. 2 to 4, and of a housing 2 according to the embodiment of FIGS. 3 and 4, for which reason reference is also made to these drawings in respect of the reference numbers mentioned below.

In a first step S1, the cable 3 and/or a stranded wire and/or a contact and/or a plug-in connector insert, already preassembled on the cable 3, of a cable 3 already provided with a cable screw-connection insert 1 is fitted, according to its respective intended use, and in step S2 the cable 3 is brought into a predetermined position of the interior of the housing shell 20.

In a step S3, the cable screw-connection insert 1 provided with the cable 3 is inserted into the housing opening 200 of the housing shell 20, and in a step S4 the flange 11 of the cable screw-connection insert 1 is brought with its contour 110 into contact with the inner contour 210 of the housing shell 20, and a non-rotatable arrangement is thereby provided. According to the advantageous design of the inner contour 210 as a gradation 21 adjoining the edge 22 of the housing opening 200 of the housing shell 20, and thus of the housing 2, in the case of this embodiment step S3 and step S4 may advantageously be executed in a single step, for which reason steps S3 and S4 are enclosed by a broken line. In a step S5, the housing shell 20 is joined to the further similar housing shell 20, such that the complete housing 2 is provided with the cable screw-connection insert 1, at least in the region of its housing opening 200.

In a step S6, the locknut 14 of the cable screw-connection insert 1 is screw-fastened and thereby fixed to the housing 2, such that a housing 2 having a fully fitted cable screw connection insert 1 is provided.

Figure 5B:
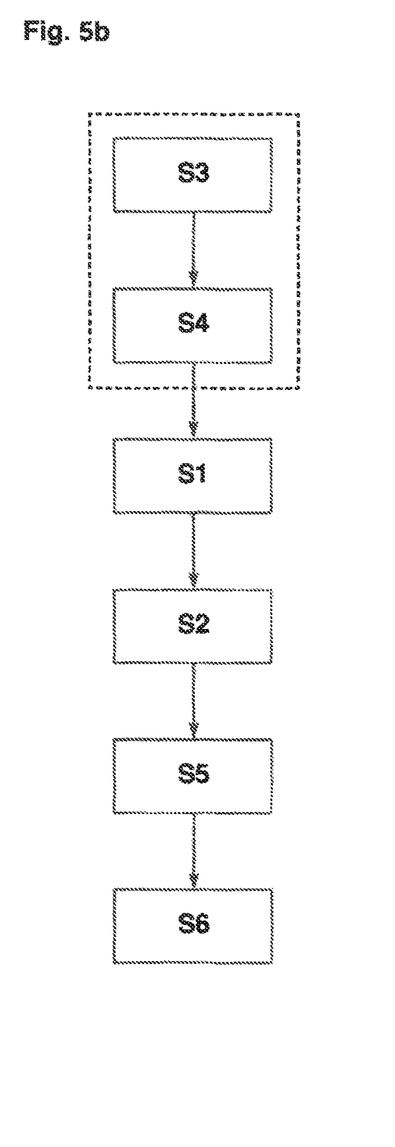

According to a modification of the preceding embodiment, step S3 and step S4 may also be executed before step S1, if advantageous. This variant is represented in FIG. 5b.

Even if various aspects or features of the invention are respectively shown in combination in the figures, it is obvious to the persons skilled in the art—unless otherwise indicated—that the combinations shown and discussed are not the only possible combinations. In particular, mutually corresponding units or groups of features from differing exemplary embodiments may be substituted for each other.

LIST OF REFERENCES

1 cable screw-connection insert
10 insert element
100 opening
11 flange
110 contour
111 flattened portion
11A stepping
12 sealing element
120 groove
13 thread
134 first threaded region
135 second threaded region
14 locknut
15 sleeve nut
151 plastic insert
152 sealing element
16 gland
2 housing
20 housing shell
200 housing opening
201 flattened portion
21 gradation
210 inner contour
211 flattened portion
22 edge
220 bevel
26 projection
260 hole
A axis
A1 detail, region
L longitudinal section
R edge
R1 direction
S1, S2, S3,
S4, S5, S6 step

The invention claimed is:

1. A cable housing assembly comprising: a housing, having a housing opening, which comprises at least two housing shells, a parting plane of which runs through the housing opening, and a cable screw-connection insert inserted into the housing opening, for the purpose of fastening the cable screw-connection insert to the housing, and the cable screw-connection insert comprises an insert element, on which a flange is configured such that the cable screw-connection insert is arranged non-rotatably in the housing shell, wherein, realized outside the housing, on the insert element, is a thread, seated on which there is a locknut, such that the cable screw-connection insert is fixed to the housing by screw-fastening of the locknut against an outer wall, in the vicinity of the housing opening, and realized at an edge of the housing opening of at least one of the housing shells, on the inside, is a gradation, having an inner contour that non-rotatably fixes the cable screw-connection insert to the housing.

2. The cable housing assembly as claimed in claim 1, wherein realized on the flange is a contour, which corresponds in a form-fitting and non-rotatable manner to an inner contour of at least one of the housing shells.

3. The cable housing assembly as claimed in claim 2, wherein the contour of the flange is circular with at least one flattened portion.

4. The cable housing assembly as claimed in claim 2, wherein arranged on the flange is a sealing element, for sealing the housing opening of the housing, which may be arranged in a groove of the insert element, and wherein a bevel, for partially accommodating the sealing element is provided at an inner edge of the housing opening.

5. The cable housing assembly as claimed in claim 4, wherein
the insert element is configured such that the edge of the housing opening corresponds on the inside to the flange and on the outside to a stepping of the insert element, such that a nesting of the insert element and the housing is provided in the region of the housing opening by the insert element inserted into the housing.

6. The cable housing assembly as claimed in claim 3, wherein
arranged on the flange is a sealing element, for sealing the housing opening of the housing, which may be arranged in a groove of the insert element, and wherein a bevel, for partially accommodating the sealing element is provided at an inner edge of the housing opening.

7. The cable housing assembly as claimed in claim 6, wherein
the insert element is configured such that the edge of the housing opening corresponds on the inside to the flange and on the outside to a stepping of the insert element, such that a nesting of the insert element and the housing is provided in the region of the housing opening by the insert element inserted into the housing.

8. The cable housing assembly as claimed in claim 1, wherein
arranged on the flange is a sealing element, for sealing the housing opening of the housing, which may be arranged in a groove of the insert element, and wherein a bevel, for partially accommodating the sealing element is provided at an inner edge of the housing opening.

9. The cable housing assembly as claimed in claim 8, wherein
the insert element is configured such that the edge of the housing opening corresponds on the inside to the flange and on the outside to a stepping of the insert element, such that a nesting of the insert element and the housing is provided in the region of the housing opening by the insert element inserted into the housing.

10. The cable housing assembly as claimed claim 1, wherein
the housing and the insert element are made of metal, and realized on the flange there is a gland for fastening an electrically conductive shield of a cable that is arranged in the cable screw-connection insert and extends into the housing.

11. The cable housing assembly as claimed in claim 1, wherein
a sleeve nut, which accommodates a sealing element and acts in combination with it, is also provided on the thread of the insert element, wherein the thread comprises a first threaded region, which acts in combination with the locknut, and a second threaded region, which acts in combination with the sleeve nut, wherein the first and the second threaded region may be spaced apart from each another, and/or are provided from different threads.

12. The cable housing assembly as claimed in claim 1, wherein
the housing is a plug-in connector housing for the insertion of an electric cable, which is preassembled with a plug-in connector insert.

13. The cable housing assembly as claimed in claim 12, wherein,
provided in the housing shell, next to the gradation and the flange of the insert element of the cable screw-connection insert, there is at least one projection that, by acting in combination with the inside wall of the housing in the vicinity of the housing opening, provides a runner-type and advantageously non-tilting guidance of the flange, wherein
the projection comprises a hole for the purpose of screw-fastening two housing shells.

14. The cable housing assembly as claimed in claim 13, wherein
the housing shell is configured as a first half-shell of the housing, the parting plane of which runs centrally through the housing opening, wherein the housing shell corresponds to a second housing shell of the housing that is of substantially identical design, and wherein the complete housing is provided by joining the first and the second housing shell, at least in the vicinity of the insert element of the cable screw-connection insert.

15. The cable housing assembly as claimed in claim 1, wherein,
provided in the housing shell, next to the gradation and the flange of the insert element of the cable screw-connection insert, there is at least one projection that, by acting in combination with the inside wall of the housing in the vicinity of the housing opening, provides a runner-type and advantageously non-tilting guidance of the flange, wherein
the projection comprises a hole for the purpose of screw-fastening two housing shells.

16. The cable housing assembly as claimed in claim 15, wherein
the housing shell is configured as a first half-shell of the housing, the parting plane of which runs centrally through the housing opening, wherein the housing shell corresponds to a second housing shell of the housing that is of substantially identical design, and wherein the complete housing is provided by joining the first and the second housing shell, at least in the vicinity of the insert element of the cable screw-connection insert.

17. A method for cable screw connection of a cable screw-connection insert, into which a cable is already inserted, for insertion into a housing opening of a housing comprising at least two housing shells, the parting plane of which runs through the housing opening, for the purpose of fastening the cable screw-connection insert to the housing, comprising the steps:
Step (1)—fitting the cable and/or a stranded wire and/or a contact and/or a plug-in connector insert already preassembled on the cable, according to its intended use;
Step (2)—placing the cable in a predetermined position;
Step (3)—inserting the cable screw-connection insert into the housing opening of a housing shell of the housing;
Step (4)—arranging a flange of the cable screw-connection insert in a non-rotatable manner with a contour in contact with an inner contour of the housing shell;
Step (5)—joining the housing shell to at least one further housing shell; and
Step (6)—screw-fastening a locknut of the cable screw-connection insert, such that the cable screw-connection insert is fixed to the housing.

18. The method for cable screw connection as claimed in claim 17, wherein
step 3 and step 4 are executed in a single step, and/or are executed before step 1.

* * * * *